(12) United States Patent
Kasavajjula et al.

(10) Patent No.: US 11,695,104 B2
(45) Date of Patent: Jul. 4, 2023

(54) METHOD AND SYSTEM FOR IMPROVED PERFORMANCE OF SILICON ANODE CONTAINING CELLS THROUGH FORMATION

(71) Applicant: Enevate Corporation, Irvine, CA (US)

(72) Inventors: Uday S. Kasavajjula, Irvine, CA (US); Benjamin Park, Mission Viejo, CA (US); David J. Lee, Irvine, CA (US); SungWon Choi, San Diego, CA (US)

(73) Assignee: ENEVATE CORPORATION, Irvine, CA (US)

( * ) Notice: Subject to any disclaimer, the term of this patent is extended or adjusted under 35 U.S.C. 154(b) by 145 days.

(21) Appl. No.: 16/549,926

(22) Filed: Aug. 23, 2019

(65) Prior Publication Data

US 2021/0057714 A1 Feb. 25, 2021

(51) Int. Cl.
| | |
|---|---|
| *H01M 4/04* | (2006.01) |
| *H01M 10/44* | (2006.01) |
| *H01M 4/38* | (2006.01) |
| *H01M 10/0525* | (2010.01) |

(52) U.S. Cl.
CPC ......... *H01M 4/0447* (2013.01); *H01M 4/386* (2013.01); *H01M 10/0525* (2013.01); *H01M 10/446* (2013.01)

(58) Field of Classification Search
CPC ............... H01M 4/0447; H01M 4/386; H01M 10/0525; H01M 10/446; H02J 7/00
See application file for complete search history.

(56) References Cited

U.S. PATENT DOCUMENTS

| | | |
|---|---|---|
| 2015/0364748 A1 | 12/2015 | Amiruddin et al. |
| 2019/0033380 A1 | 1/2019 | Kim et al. |
| 2019/0181491 A1 | 6/2019 | Park et al. |

OTHER PUBLICATIONS

PCT, Notification of Transmittal of the International Search Report and the Written Opinion of the International Searching Authority in Application No. PCT/US2020/047021 dated Nov. 9, 2020 (8 pages).

*Primary Examiner* — Ula C Ruddock
*Assistant Examiner* — Thomas H. Parsons
(74) *Attorney, Agent, or Firm* — McAndrews, Held & Malloy, Ltd.

(57) ABSTRACT

Systems and methods for improved performance of silicon anode containing cells through formation may include a cathode, electrolyte, and silicon containing anode. The battery may be subjected to a formation process comprising one or more cycles of: charging the battery at a 1 C rate to 3.8 volts or greater until a current in the battery reaches C/20, and discharging the battery to 2.5 volts or less. The battery may comprise a lithium ion battery. The electrolyte may comprise a liquid, solid, or gel. The anode may comprise greater than 70% silicon. The battery may be discharged until the current reaches 0.2 C. The battery may be discharged at a 1 C rate or at a 0.2 C rate. The battery may be in a rest period between the charge and discharge.

20 Claims, 6 Drawing Sheets

METHOD AND SYSTEM FOR IMPROVED PERFORMANCE OF SILICON ANODE CONTAINING CELLS THROUGH FORMATION

CROSS-REFERENCE TO RELATED APPLICATIONS/INCORPORATION BY REFERENCE

N/A

FIELD

Aspects of the present disclosure relate to energy generation and storage. More specifically, certain embodiments of the disclosure relate to a method and system for improved performance of silicon anode containing cells through formation.

BACKGROUND

Conventional approaches for battery anodes may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for improved performance of silicon anode containing cells through formation, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE INVENTION

Figure 1:
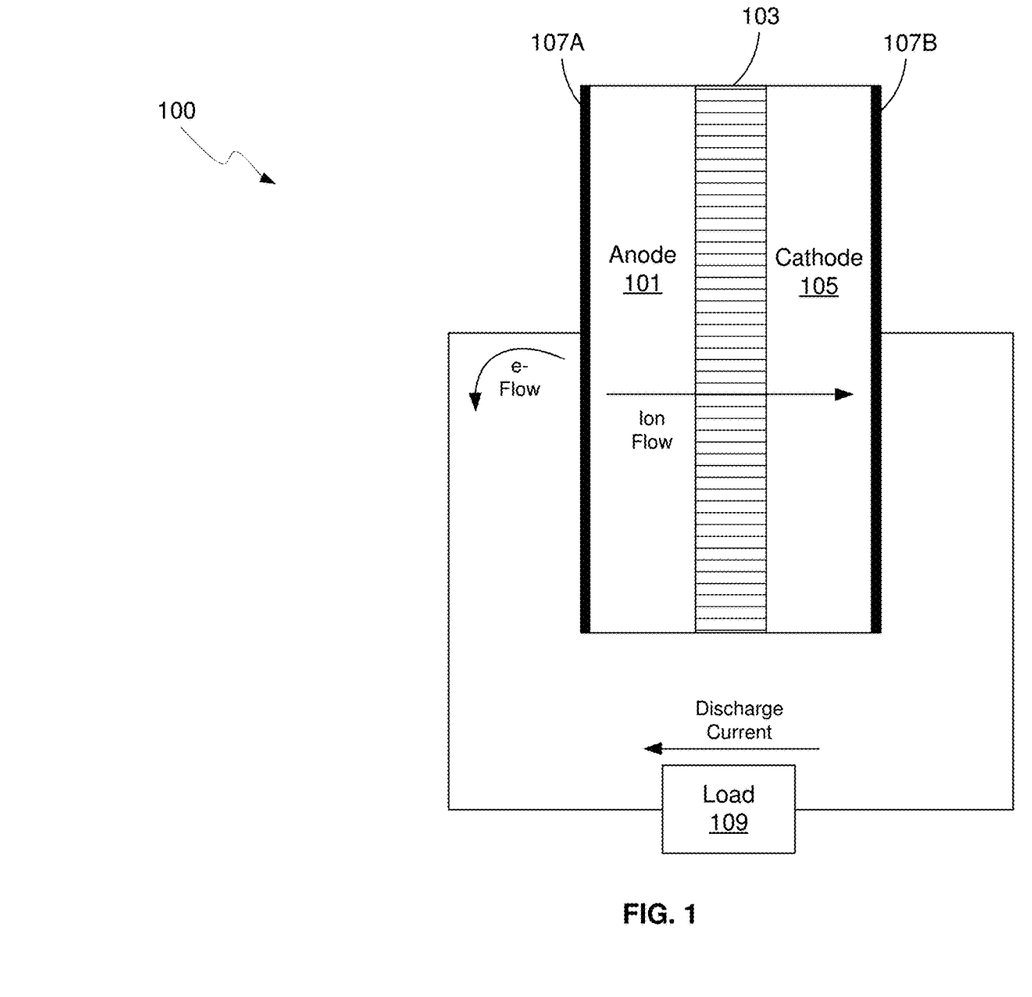
FIG. 1 is a diagram of a battery with an ultra-high voltage cobalt-free cathode, in accordance with an example embodiment of the disclosure.

FIG. 1 is a diagram of a battery, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack.

The anode 101 and cathode 105, along with the current collectors 107A and 107B may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the active material in forming electrodes.

The configuration shown in FIG. 1 illustrates the battery 100 in discharge mode, whereas in a charging configuration, the load 109 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$ etc. The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. In an example scenario, the cathode may comprise a nickel oxide. The anode 101 may comprise a silicon, carbon, or combinations of these materials, for example. Typical anode electrodes comprise a carbon material that include a current collector such as a copper sheet. Carbon is often used because it has excellent electrochemical properties and is also electrically conductive. Anode electrodes currently used in the rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Silicon anodes may be formed from silicon composites, with more than 50% silicon, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

A lithium ion rechargeable battery typically comprises an anode (negative electrode), cathode (positive electrode), separator, electrolyte, and housing. Typically, after assembly, lithium ion batteries go through a specific process called formation, where a slow charge or a certain sequence of electrical, thermal, physical acts are done to a cell in order to initialize the cell before the cell is shipped outside the factory. One important aspect of the first charge, in particular, is that it is designed to form a beneficial solid electrolyte interface (SEI) layer on the anode to prevent excessive reduction of electrolyte on the anode surface.

For a lithium ion battery including graphite as the main anode active material, formation typically is comprised of four steps, although many formation regimes are highly secret and are more complex than the following: slow charge to a voltage higher than 3.5V to facilitate SEI layer formation on the graphite anode, rest, discharge to a specific voltage either for measuring the capacity of the cell or to specific shipping voltage, and finally another rest step. For lithium ion batteries with a graphite anode, the first step of slow charging is often considered the most important step of the formation that enables good cycling and storage performance. However, for lithium ion batteries with anodes containing silicon (especially batteries where the silicon is the only active material or the main active material), such conventional formation will result in poor performance under certain cycling conditions.

Figure 2:
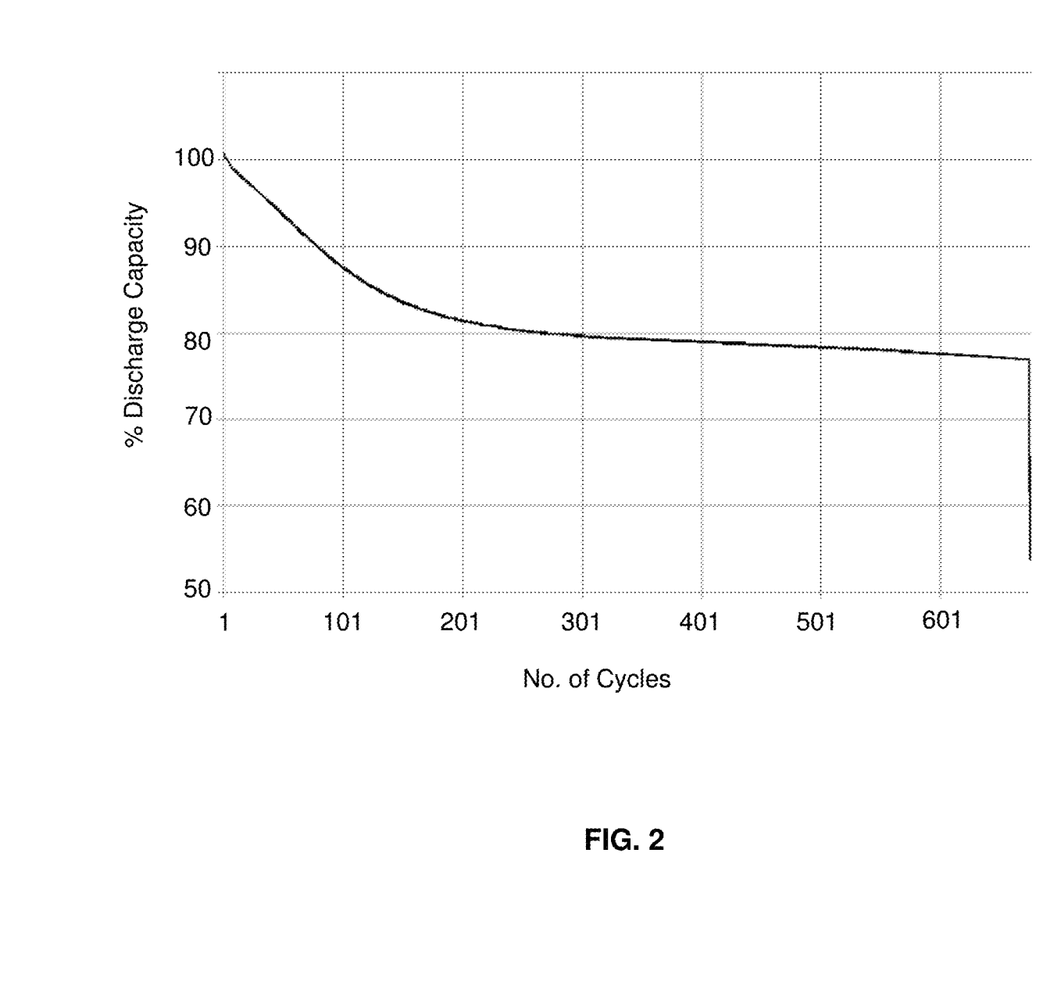
FIG. 2 illustrates the cycling performance of a lithium ion battery with a silicon anode using conventional formation, cycled between 4.2V and 3.2V and a first cycling scenario, in accordance with an example embodiment of the disclosure.

FIG. 2 illustrates the cycling performance of a lithium ion battery with a silicon anode using conventional formation, cycled between 4.2V and 3.2V and a first cycling scenario, in accordance with an example embodiment of the disclosure. Referring to FIG. 2, there is shown the cycling performance of a lithium ion battery with silicon as an anode, where the cell is formed using conventional formation. Although the formation here is four cycles, most commercial formation procedures are done in 1 or less cycles. The formation in this case is performed with the lower discharge cut-off voltage at 3.3V. In each cycle, the cell is charged to 4.2V at 1 C rate until the current reached C/20 and the cell is discharged to 3.3V. A C-rate is a measure of the rate at which a battery is charged or discharged relative to its maximum capacity. A 1 C discharge rate means that the discharge current discharges the nominal rated capacity of the battery in 1 hour, so for a battery with a capacity of 100 Amp-hrs, this equates to a discharge current of 100 amps in 1 hour. A 5 C rate for this battery would be 500 amps, and a C/2 rate would be 50 amps. The rest period in each cycle comprises a time without charging or discharging, i.e., with no load, and may be any amount of time where the battery reaches a steady state. Example times are 10 minutes, 15 minutes, or even 30 minutes or more. In another scenario, rest periods may run several hours. At least 10 minutes is a suitable minimum.

The anode in this example is a silicon dominant anode, e.g., a Si>70% film, the cathode is NCA mixed with conductive additive & PVDF, and the electrolyte is $LiPF_6$ dissolved in a blend of carbonates. To measure discharge capacity fade with cycles, i.e., cycle life, the cell is charged and discharged between 4.2V and 3.2V (scenario-1). In this scenario, the lithium ion battery has a capacity fade of ~20% after 200 cycles. Typically, <20% capacity fade after 500-1000 cycles is desired for most commercial applications.

Figure 3:
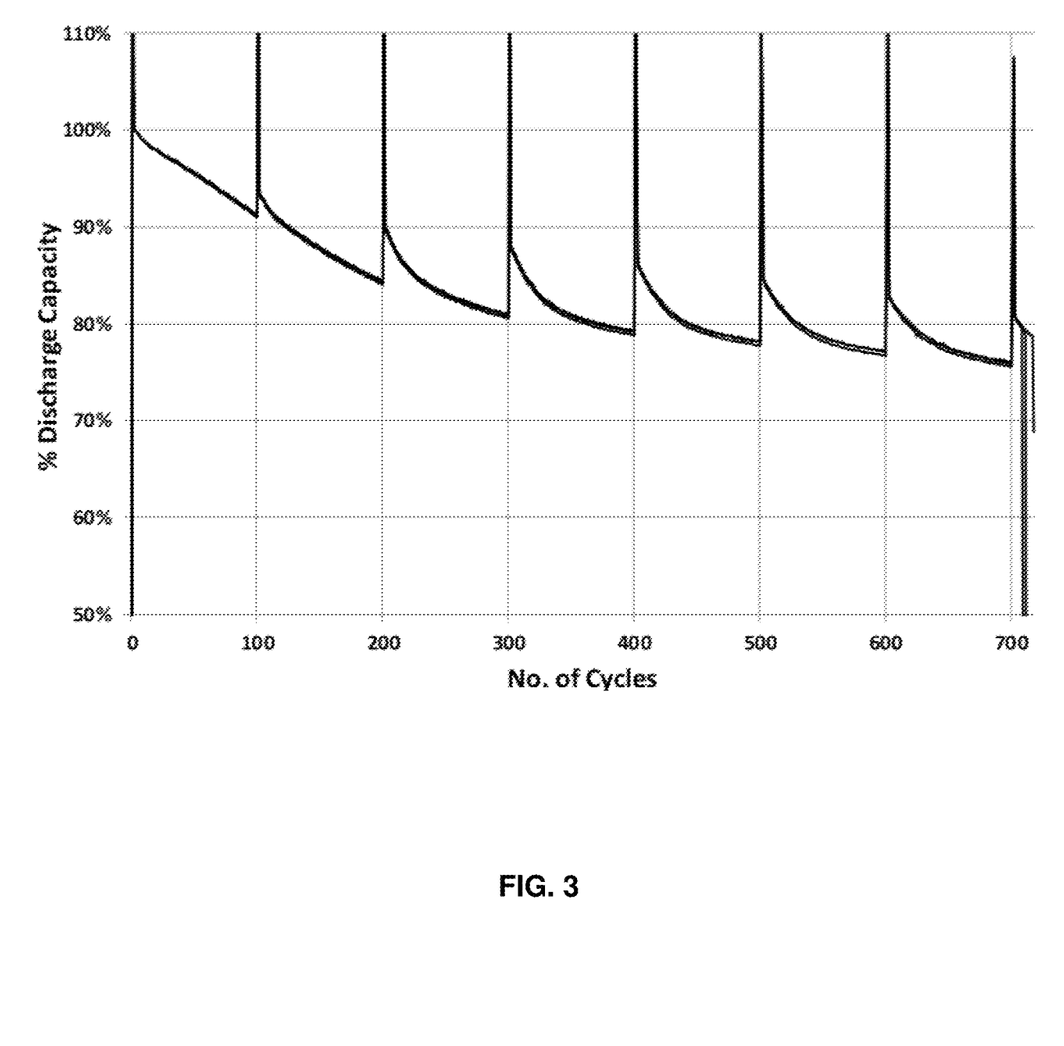
FIG. 3 shows the cycling performance of a lithium ion battery with a silicon anode using conventional formation, cycled between 4.2V and 3.2V and a second cycling scenario, in accordance with an example embodiment of the disclosure.

FIG. 3 shows the cycling performance of a lithium ion battery with a silicon anode using conventional formation, cycled between 4.2V and 3.2V and a second cycling scenario, in accordance with an example embodiment of the disclosure. In this scenario, scenario-2, the cell design is the same as scenario-1. However, in scenario-2, a lithium ion battery with the silicon anode has a unique phenomenon of faster capacity fade during cycling to 3.2V and capacity recovery every 100 cycles, when the cell is discharged to a voltage of less than 3.2V.

Here it should be noted that in both scenario-1 and scenario-2, the lithium ion battery is cycled between 4.2V and 3.2V, but in Scenario-2 there is a deeper discharge cycle every 100$^{th}$ cycle where the discharge voltage is less than 3.2V. These results show that a conventional formation may result in significant variability in cycling performance. The cycling performance in both scenario-1 and scenario-2 represent a premature failure of a lithium ion battery with anode containing silicon when conventional formation is used. Such performance is unacceptable in practical applications as it can result in failures in the functioning of the end product.

Figure 4:
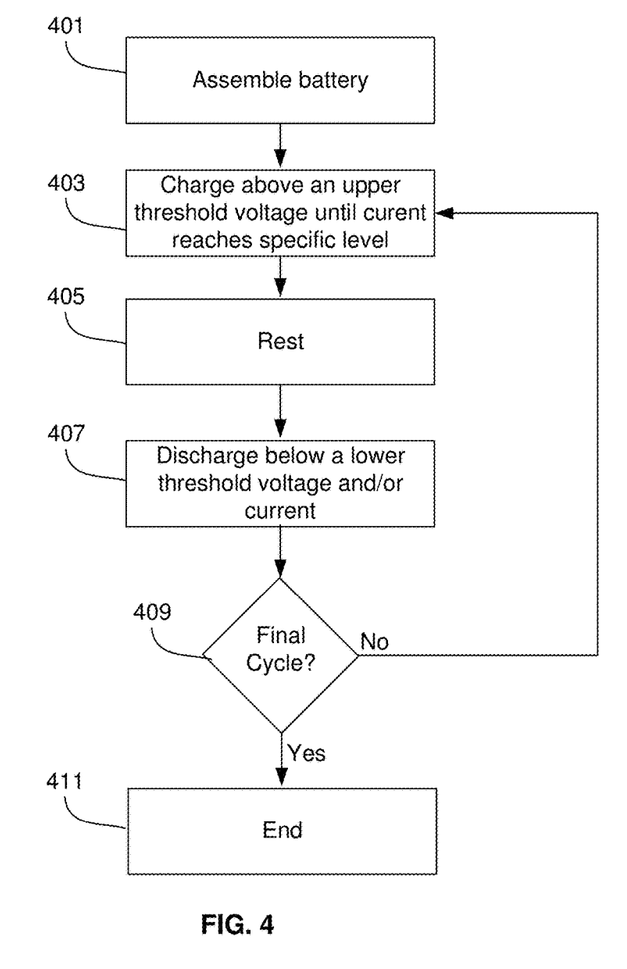
FIG. 4 illustrates a process flow for a formation process for a battery with silicon anode, in accordance with an example embodiment of the disclosure.

FIG. 4 illustrates a process flow for a formation process for a battery with silicon anode, in accordance with an example embodiment of the disclosure. In an example scenario, the cathode may comprise a nickel containing oxide. Referring to FIG. 4, the process starts in step 401, where a battery is assembled with anode, cathode, separator, electrolyte, and housing. As stated above, the term "battery" may be used to indicate a single electrochemical cell, a plurality of electrochemical cells formed into a module, and/or a plurality of modules formed into a pack.

The process continues in step 403 where the battery is charged above a certain voltage/charge, followed by step 405 where the battery is put in a rest state with no charge or discharge for a time interval, before proceeding to step 407 where the battery is discharged below a threshold voltage. If, in step 409, this cycle is the final cycle, the process finishes with end step 411, but if there is to be more than one cycle, the process returns to step 403 for another charge/rest/discharge cycle. Table 1 illustrates the different formation sequences that may be utilized for the silicon anode batteries, where a rest is utilized between each of the charge/discharge steps. The main theme of the process being that all of the sequences force the cell to discharge to a substantially fully discharged state (e.g. 2.5V or so in a nickel-cathode-based system).

TABLE 1

Formation methods to prevent premature failure of silicon anode lithium ion batteries.

| # of Cycles | Charge | Discharge |
|---|---|---|
| 1 | 1 C to 4.2 V until current reaches C/20 | 1 C to 2.5 V |
| 2 | 1 C to 4.2 V until current reaches C/20 | 1 C to 2.5 V |
| 3 | 1 C to 4.2 V until current reaches C/20 | 1 C to 2.5 V |
| 1 | 1 C to 4.2 V until current reaches C/20 | 1 C to 2.5 V until current reaches 0.2 C or 0.2 C to 2.5 V |
| 2 | 1 C to 4.2 V until current reaches C/20 | 1 C to 2.5 V until current reaches 0.2 C or 0.2 C to 2.5 V |
| 3 | 1 C to 4.2 V until current reaches C/20 | 1 C to 2.5 V until current reaches 0.2 C or 0.2 C to 2.5 V |
| 1 | 1 C to 4.2 V until current reaches C/20 | 1 C to 2.0 V |
| 2 | 1 C to 4.2 V until current reaches C/20 | 1 C to 2.0 V |
| 3 | 1 C to 4.2 V until current reaches C/20 | 1 C to 2.0 V |
| 1 | 1 C to 4.2 V until current reaches C/20 | 1 C to 2.0 V until current reaches 0.2 C or 0.2 C to 2.0 V |
| 2 | 1 C to 4.2 V until current reaches C/20 | 1 C to 2.0 V until current reaches 0.2 C or 0.2 C to 2.0 V |
| 3 | 1 C to 4.2 V until current reaches C/20 | 1 C to 2.0 V until current reaches 0.2 C or 0.2 C to 2.0 V |
| 3 | 1 C to 4.2 V until current reaches C/20 | 1 C to 1.1 V until current reaches 0.2 C or 0.2 C to 1.1 V |
| 1 | 1 C to 4.2 V until current reaches C/20 | 1 C to 0.5 V until current reaches 0.2 C or 0.2 C to 0.5 V |
| 1 | 1 C to 4.2 V until current reaches C/20 | 1 C to X % charge capacity where $0.77 \leq X \leq 0.99$ |
| 2 | 1 C to 4.2 V until current reaches C/20 | 1 C to X % charge capacity where $0.77 \leq X \leq 0.99$ |
| 3 | 1 C to 4.2 V until current reaches C/20 | 1 C to X % charge capacity where $0.77 \leq X \leq 0.99$ |

One aspect of the charge/rest/discharge cycles above is that the cell may be charged beyond a certain amount and then fully discharged beyond a certain amount in order to remove the lithium from the silicon before cycling. The amount that is charged and discharged may correspond to voltage. The charge voltage may have to be higher than 3.8V, 4.0V, or, 4.1V. The discharge voltage may have to be lower than 2.5V. The charge capacity may have to be higher than 80% of the total reversible capacity of the cell and the discharge capacity may have to be lower than 23% of the remaining capacity.

Figure 5:
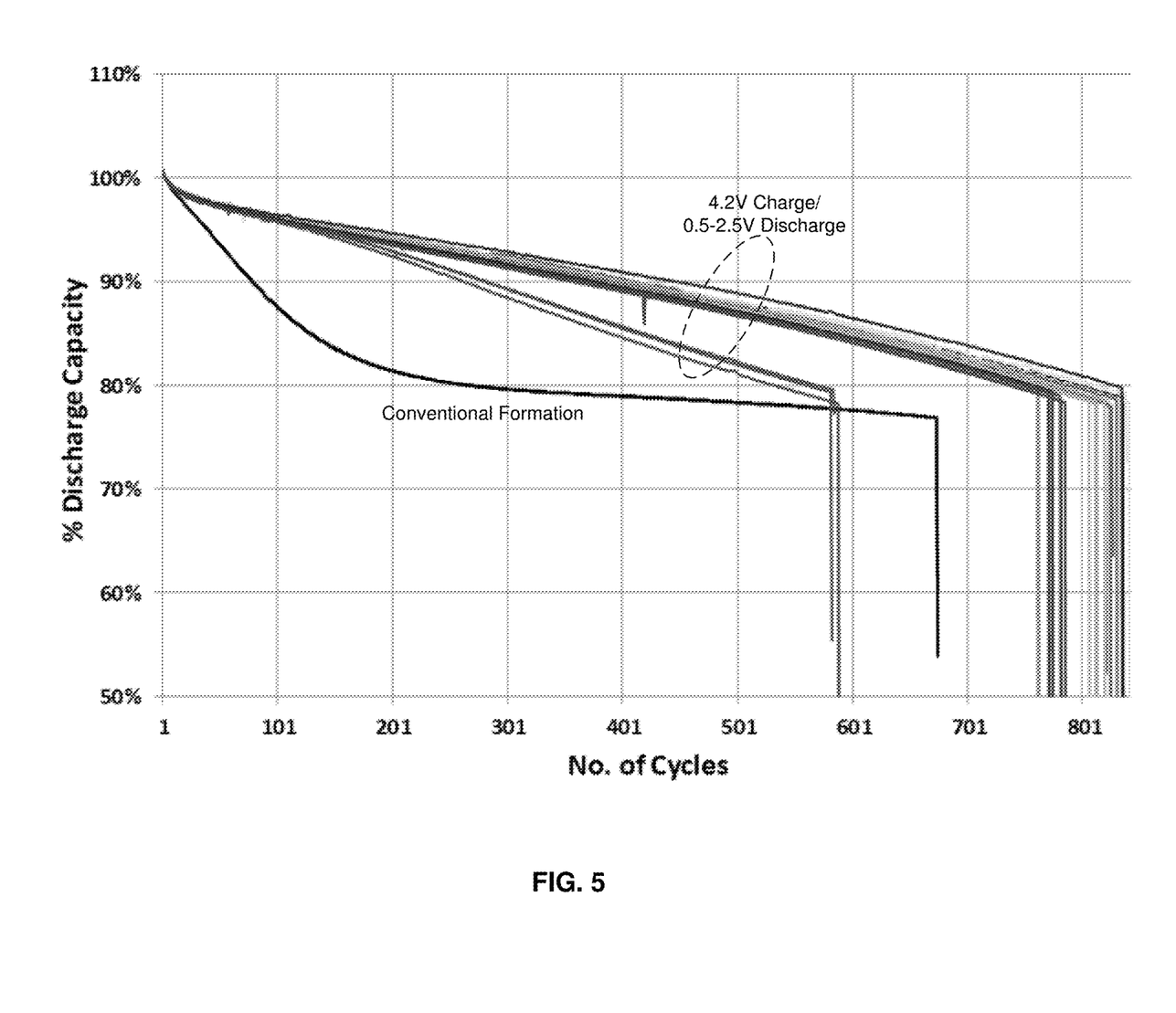
FIG. 5 illustrates the cycling performance of lithium ion batteries with silicon containing anodes using new formation, cycled between 4.2V and 3.2V and a first cycling scenario, in accordance with an example embodiment of the disclosure.

FIG. 5 illustrates the cycling performance of lithium ion batteries with silicon containing anodes using new formation, cycled between 4.2V and 3.2V and a first cycling scenario, in accordance with an example embodiment of the disclosure. Referring to FIG. 5, there are shown plots of discharge capacity versus number of cycles. The plots show the improved cycling performance of lithium ion batteries with anode containing silicon for cycling scenario-1, when the new formation methods described above are used. In the conventional formation process, the silicon containing anode battery drops 20% of discharge capacity after around 200 cycles. However, with the improved formation cycles described with respect to FIG. 4, the battery lasts more than 750 cycles before 20% capacity fade. This corresponds to a 275% improvement in cycle life.

Figure 6:
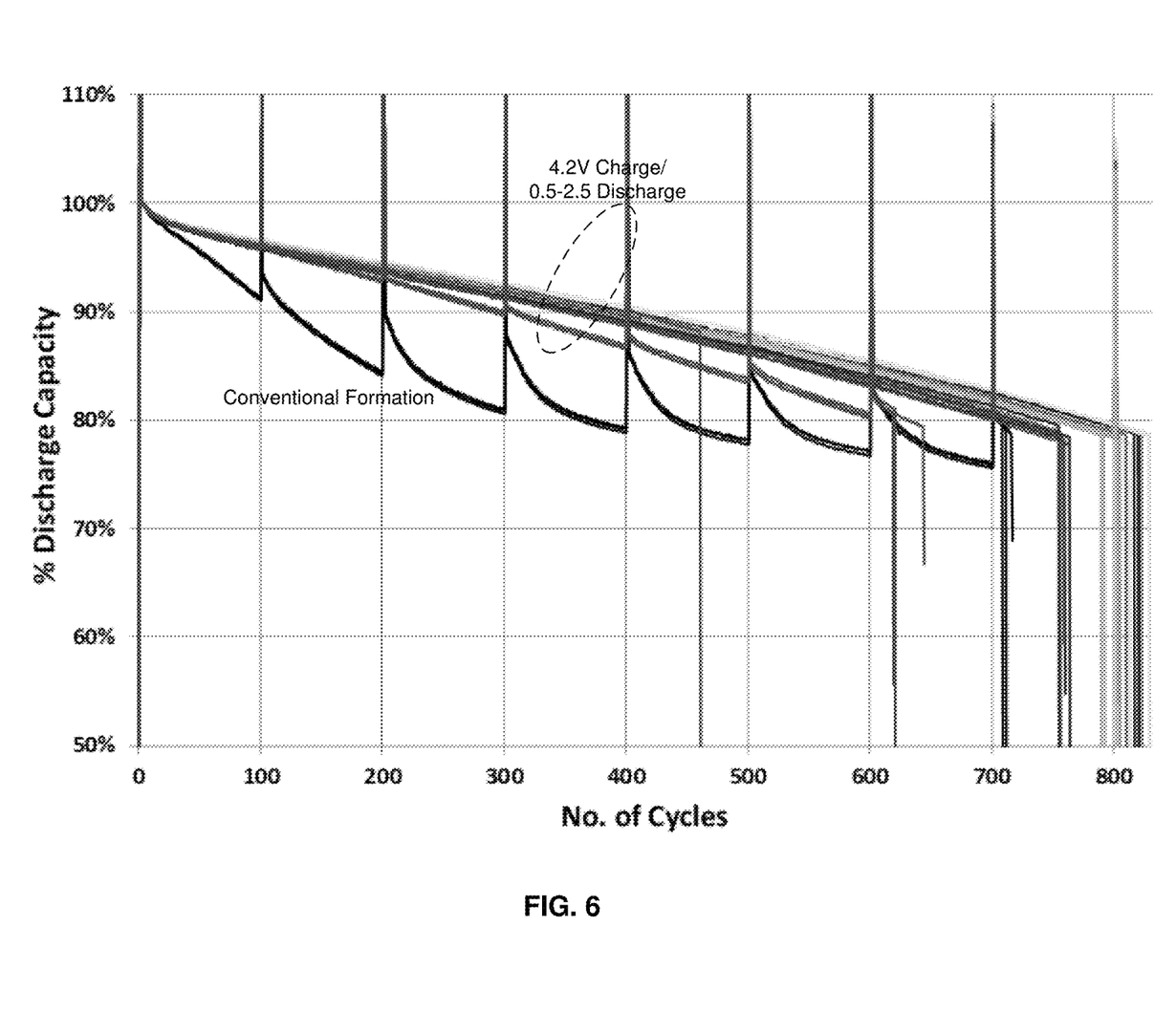
FIG. 6 illustrates the cycling performance of lithium ion batteries with silicon containing anodes using new formation, cycled between 4.2V and 3.2V and a first cycling scenario, in accordance with an example embodiment of the disclosure.

FIG. 6 illustrates the cycling performance of lithium ion batteries with silicon containing anodes using new formation, cycled between 4.2V and 3.2V and a first cycling scenario, in accordance with an example embodiment of the disclosure. Referring to FIG. 6, there are shown plots of discharge capacity versus number of cycles. FIG. 6 shows the improved cycling performance of lithium ion batteries with anode containing silicon for cycling scenario-2, when the new formation methods described with respect to FIG. 4 are used. In an example scenario, the cathode may comprise a nickel containing oxide. When the new formation methods are used, the phenomenon of faster capacity fade and capacity recovery is eliminated. Comparing FIGS. 5 and 6, it can be understood that the variation in cycling performance between scenario-1 and scenario-2 is significantly reduced by using the new formation methods described in this disclosure.

In an example embodiment of the disclosure, a method and system is described for improved performance of silicon anode containing cells through formation. The system may comprise a cathode, an electrolyte, and a silicon containing anode, where the battery is subjected to a formation process comprising one or more cycles of: charging the battery at a 1C rate to 3.8 volts or greater until a current in the battery reaches C/20, and discharging the battery to 2.5 volts or less. The battery may comprise a lithium ion battery. The electrolyte may comprise a liquid, solid, or gel. The anode may comprise greater than 70% silicon. The battery may be discharged until the current reaches 0.2 C. The battery may be discharged at a 1 C rate. The battery may be discharged at a 0.2 C rate. The battery may be in a rest period between the charge and discharge.

In another example embodiment, a method and system is described for improved performance of silicon anode containing cells through formation. The method may comprise, in a battery comprising an anode, a cathode, and an electrolyte, with the anode comprising silicon, charging the battery at a 1 C rate to 4.2 volts or greater until a current in the battery reaches C/20, and discharging the battery at a 1 C rate to X percentage of charge capacity where X ranges from 0.77 to 0.99. The battery may comprise a lithium ion battery. The electrolyte may comprise a liquid, solid, or gel. The anode may comprise greater than 70% silicon.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry or a device is "operable" to perform a function whenever the circuitry or device comprises the necessary hardware and code (if any is necessary) to perform the function, regardless of whether performance of the function is disabled or not enabled (e.g., by a user-configurable setting, factory trim, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A battery, the battery comprising:
   a nickel containing cathode, an electrolyte, and a silicon containing anode, wherein the anode comprises greater than 50% silicon, with the battery being subjected to a formation process that comprises one or more cycles of the following steps:
   charging the battery at a 1 C rate to at least a formation charge threshold of 3.8 volts or greater until a current in the battery reaches C/20; and
   discharging the battery to at least a formation discharge threshold of 2.5 volts or less, wherein the formation discharge threshold is lower than a discharge threshold used during normal operation of the battery.

2. The battery of claim 1, wherein the battery comprises a lithium ion battery.

3. The battery according to claim 1, wherein the electrolyte comprises a liquid, solid, or gel.

4. The battery according to claim 1, wherein the anode comprises greater than 70% silicon.

5. The battery according to claim 1, wherein the battery is discharged until the current reaches 0.2 C.

6. The battery according to claim 1, wherein the battery is discharged at a 1 C rate.

7. The battery according to claim 1, wherein the battery is discharged at a 0.2 C rate.

8. The battery according to claim 1, wherein the battery is in a rest period between the charge and discharge.

9. A method of forming a battery, the method comprising:
   subjecting a battery comprising an anode, a nickel oxide containing cathode, and an electrolyte to a formation process, the anode comprising greater than 50% silicon, wherein the formation process comprises, for at least one cycle:
   charging the battery at a 1 C rate to at least a formation charge threshold of 3.8 volts or greater until a current in the battery reaches C/20; and
   discharging the battery to at least a formation discharge threshold of less than 2.5 volts, wherein the formation discharge threshold is lower than a discharge threshold used during normal operation of the battery.

10. The method according to claim 9, wherein the battery comprises a lithium ion battery.

11. The method according to claim 9, wherein the electrolyte comprises a liquid, solid, or gel.

12. The method according to claim 9, wherein the anode comprises greater than 70% silicon.

13. The method according to claim 9, wherein the battery is discharged until the current reaches 0.2 C.

14. The method according to claim 9, wherein the battery is discharged at a 1 C rate.

15. The method according to claim 9, wherein the battery is discharged at a 0.2 C rate.

16. The method according to claim 9, wherein the battery is in a rest period between the charge and discharge.

17. A method of forming a battery, the method comprising:
   subjecting a battery comprising an anode, a nickel oxide containing cathode, and an electrolyte to a formation process, the anode comprising greater than 50% silicon, wherein the formation process comprises, for at least one cycle:
   charging the battery at a 1 C rate to 3.8 volts or greater until a current in the battery reaches C/20; and
   discharging the battery at a 1 C rate to X percentage of charge capacity, where X ranges from 0.77 to 0.99.

18. The method according to claim 17, wherein the battery comprises a lithium ion battery.

19. The method according to claim 17, wherein the electrolyte comprises a liquid, solid, or gel.

20. The method according to claim 17, wherein the anode comprises greater than 70% silicon.

* * * * *